J. P. NIKONOW.
STARTING MECHANISM FOR AUTOMOBILES.
APPLICATION FILED JULY 24, 1914.

1,184,866.

Patented May 30, 1916.
2 SHEETS—SHEET 2.

WITNESSES:

INVENTOR
John P. Nikonow.
BY
ATTORNEY

UNITED STATES PATENT OFFICE.

JOHN P. NIKONOW, OF WILKINSBURG, PENNSYLVANIA, ASSIGNOR TO WESTINGHOUSE ELECTRIC AND MANUFACTURING COMPANY, A CORPORATION OF PENNSYLVANIA.

STARTING MECHANISM FOR AUTOMOBILES.

1,184,866.  Specification of Letters Patent.  Patented May 30, 1916.

Application filed July 24, 1914. Serial No. 852,824.

*To all whom it may concern:*

Be it known that I, JOHN P. NIKONOW, a subject of the Czar of Russia, and a resident of Wilkinsburg, in the county of Allegheny and State of Pennsylvania, have invented a new and useful Improvement in Starting Mechanism for Automobiles, of which the following is a specification.

My invention relates to starting mechanisms for automobiles and particularly to such mechanisms as embody friction gear wheels for operatively connecting starting motors to the engines of automobiles or other motor vehicles.

My invention has for its object to provide a mechanism of the character indicated above that is simple in construction and compact in arrangement and that operates automatically to effect the engagement of friction gear wheels to connect a starting motor to the shaft of an internal combustion engine.

When friction gear wheels are employed to transmit considerable power, it is necessary that the wheels be pressed toward each other with such force that one wheel cannot slip relatively to the other. This action is most likely to occur when the motive power is initially applied to overcome the inertia of the load. In starting gas engines, the compression of one of the several cylinders also opposes the initial movement of the engine shaft by the starting motor. Since a source of power of large capacity is neither available nor practicable in connection with motor vehicles, it is essential that a mechanism be employed by means of which the application of a small force operates to firmly press the coacting wheels together.

According to the present invention, I provide a toggle mechanism which is actuated by an electromagnet to shift a movable pinion into engagement with an engine fly wheel. A switch, which controls the motor circuit, is controlled by the electromagnet to complete the motor circuit when the friction wheels are firmly engaged. The system is entirely automatic and is controlled by a conveniently located push button in the circuit of the electromagnet.

Figure 1:
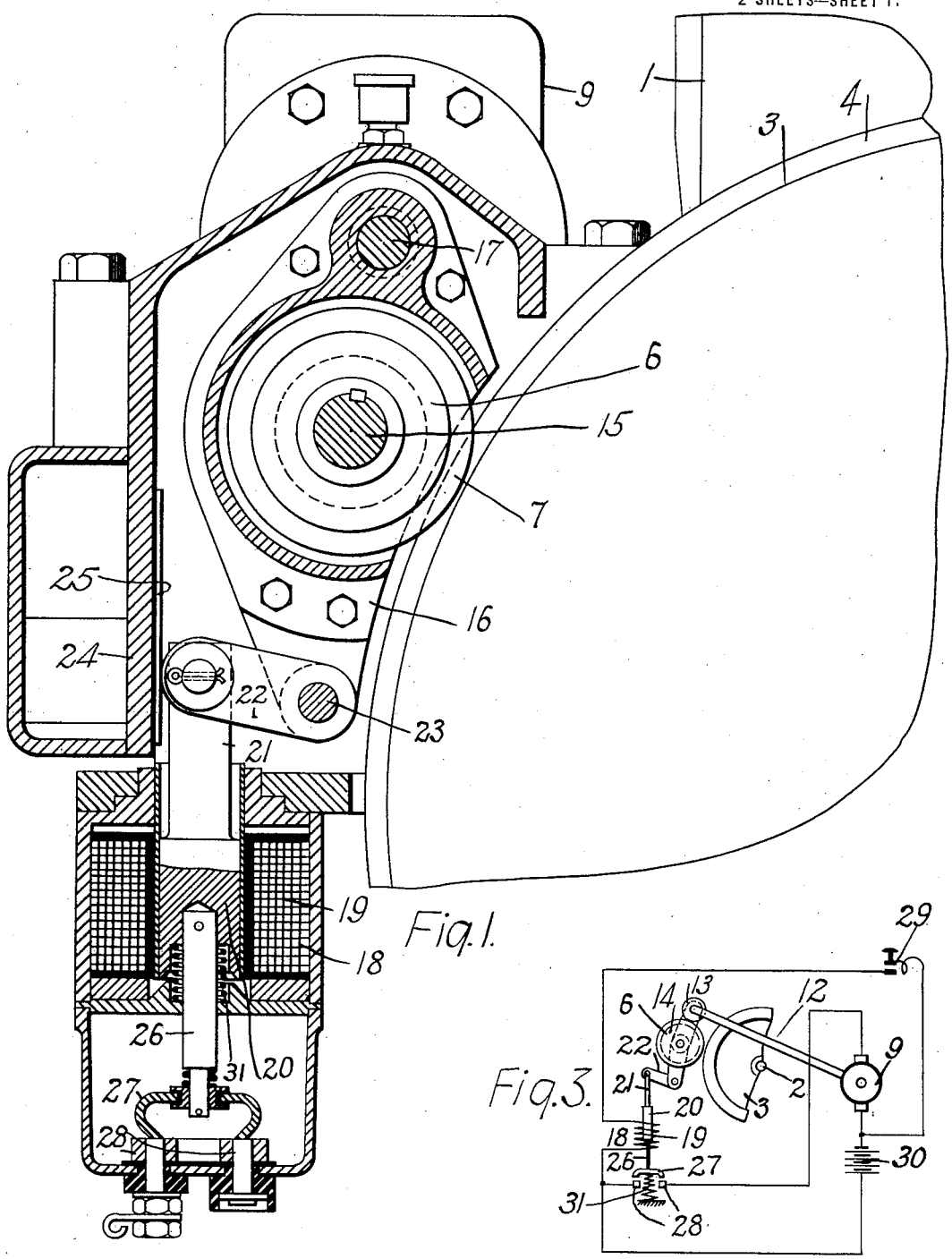
Figure 2:
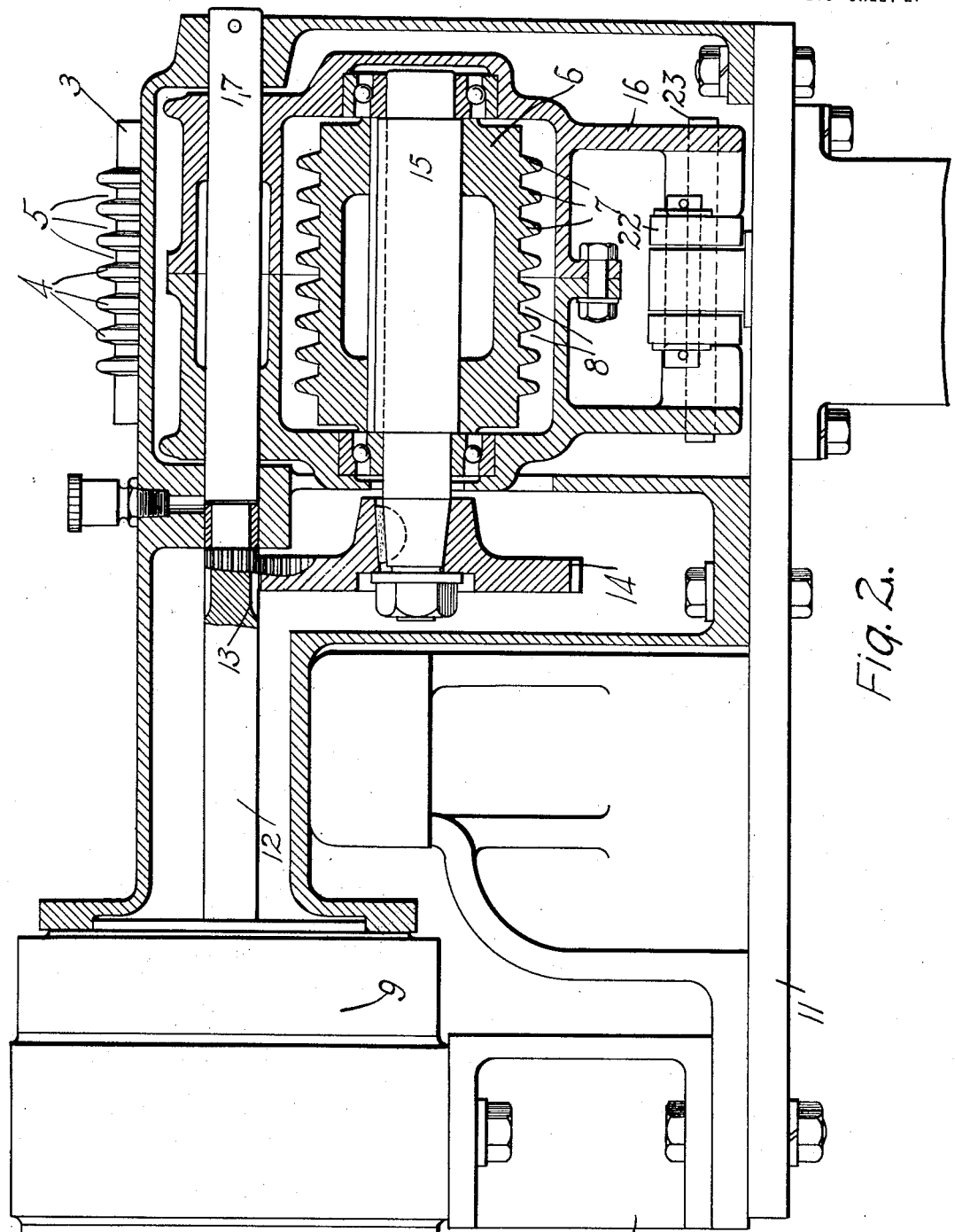

In the accompanying drawings, Figure 1 is a view, partially in elevation and partially in section, of an engine with my invention applied thereto; Fig. 2 is a similar view of the mechanism of Fig. 1 taken at right angles thereto. Fig. 3 is a diagrammatic view of circuits and apparatus embodying my invention. An automobile engine 1, only a portion of which is shown, has a shaft 2 and a fly wheel 3 mounted thereon. The periphery of the fly wheel is provided with a number of annular ribs or projections 4 that are spaced apart to form grooves 5.

A friction wheel 6, that is adapted to coact with the fly wheel 3, is provided with corresponding annular ribs 7 and grooves 8. An electric motor 9 is supported by a suitable bracket 10 that is attached to a frame member 11. The motor 9 has an armature shaft 12 which is connected to the friction wheel 6 by means of a pinion 13, a gear wheel 14 and a shaft 15 upon which the wheel 6 is mounted. The shaft 15 is rotatably mounted in a hollow casing or housing 16 that is pivotally supported by a shaft 17 which is in axial alinement with the armature shaft 12. By means of this arrangement, the wheel 6 and the gear wheel 14 may be partially revolved about the shafts 17 and 12, respectively, without disconnecting the gear wheel 14 from the pinion 13.

Referring particularly to Fig. 1, an electromagnet 18 comprises a coil 19 and a core member 20 that has an extended portion 21. The core member 20 is connected to the casing 16 by means of a link 22 and a short shaft 23. The link 22, shaft 23 and the housing 16 form a toggle mechanism that is actuated by the electromagnet 18 through the core member 20. A side wall of a housing 24, which incloses the starting mechanism, is provided with a bearing plate 25 of hardened steel, or other suitable material, which is engaged by one end of the link 22 during the reciprocation of the core member 20. The engagement of the link 22 and the bearing plate 25 serves to maintain the alinement of the core member 20 and to relieve the magnet structure of the lateral stresses which are produced by the reciprocation of the core member 20. A rod 26, which is connected to the core member 20 and projects downwardly therefrom, carries, at its lower end, the movable member 27 of a switch for controlling the circuit of the motor 9. In its closed position, the switch member 27 bridges two stationary contact members 28 to complete the motor circuit. The various parts are so arranged that the motor circuit is completed only after the wheel 6 is firmly connected to the fly wheel 3.

Referring to Fig. 3, which is a diagrammatic view of the circuits and apparatus embodying my invention, the circuit of the magnet coil 19 is controlled by a push button 29 which may be located at any point within convenient reach of the operator. A storage battery 30 supplies current to the starting motor 9 and the electromagnet coil 19. Normally, a spring 31 retains the core member 20 in its elevated position to disconnect the friction wheel 6 from the fly wheel 3. When it is desired to start the engine, the operator presses the push button 29 and the magnet coil 19 is energized to actuate the core member 20 downwardly. The housing 16 which carries the shaft 15 and the friction wheel 6 is pressed toward the fly wheel 3 to connect the friction wheel 6 with the fly wheel. When the coacting friction surfaces of the wheels are firmly engaged, the switch member 27 bridges the stationary contact terminals 28 to close the motor circuit. The several parts now occupy the respective positions illustrated in Fig. 1. The motor then rotates the engine shaft by means of the gear mechanism above described. When the engine starts under its own power, the operator releases the push button 29 to deënergize the magnet coil 19. The spring 31, which has been compressed, then operates to return the core member 20 to its upper position, thereby simultaneously opening the motor circuit and returning the housing 16 and the friction wheel 6 to their inoperative positions.

It will be noted that I provide a simple and effective means for automatically effecting the operative connection of a starting motor to an internal combustion engine by the actuation of a single push button. I provide also an arrangement that occupies a small space and requires a small amount of energy for its operation to press the friction wheels together with a heavy pressure.

I claim as my invention:

1. In a starting mechanism, the combination with an engine shaft, and a starting motor, of means for operatively connecting said motor to said shaft, means comprising a toggle mechanism for effecting the engagement of said connecting means, and means for effecting the simultaneous operation of said motor and said toggle mechanism.

2. In a starting mechanism, the combination with an engine shaft, and a starting motor, of means for operatively connecting said motor to said shaft, means comprising a toggle mechanism and an electromagnet for effecting the engagement of said connecting means, and common means for controlling said motor and said electromagnet.

3. In a starting mechanism, the combination with an engine shaft, of a starting motor, means comprising relatively movable gear wheels for operatively connecting said motor to said shaft, means comprising a toggle mechanism and a power device for effecting the engagement of said gear wheels, and a single means for controlling said motor and said power device.

4. In a starting mechanism, the combination with an engine shaft, of a starting motor, means comprising relatively movable gear wheels for operatively connecting said motor to said shaft, means comprising a toggle mechanism and an electromagnet for effecting the engagement of said gear wheels, and a single switch for controlling the operation of said motor and said electromagnet.

5. In a starting mechanism, the combination with an engine shaft, an electric starting motor, and means for operatively connecting said motor to said shaft, of a switch for controlling the motor circuit, a toggle mechanism, and an electromagnet for simultaneously controlling said switch and said toggle mechanism to effect the engagement of said connecting means.

6. In a starting mechanism, the combination with an engine shaft, a motor having a shaft, and means for operatively connecting said motor to said engine shaft, said means comprising a pivotally supported pinion, of means comprising a toggle mechanism for actuating said pinion about its pivotal support to effect the engagement of said connecting means, and means connected to said toggle mechanism for controlling said motor.

7. In a starting mechanism, the combination with an engine shaft, a gear wheel thereon, a motor having a shaft, and a pinion operatively connected to the motor shaft and pivotally supported for lateral movement into and out of engagement with said gear wheel, of means comprising a toggle mechanism for automatically controlling the position of said pinion, and means for simultaneously effecting the operation of said motor and said toggle mechanism.

In testimony whereof, I have hereunto subscribed my name this 20th day of July, 1914.

JOHN P. NIKONOW.

Witnesses:
B. B. HINES,
M. C. MERZ.